Patented Nov. 7, 1922.

1,434,959

UNITED STATES PATENT OFFICE.

ERNST MAIER, OF VIENNA, AUSTRIA.

MANUFACTURE OF BODIES OF REENFORCED CONCRETE.

No Drawing. Application filed October 26, 1920. Serial No. 419,783.

*To all whom it may concern:*

Be it known that I, ERNST MAIER, residing at Vienna, in the Province of Lower Austria, State of Austria, have invented certain new and useful Improvements in or Relating to the Manufacture of Bodies of Reenforced Concrete; and I do hereby declare the following to be a full, clear, and exact description of the invention, such as will enable others skilled in the art to which it appertains to make and use the same.

My invention relates to improvements in the manufacture of bodies of reenforced concrete and more particularly to a process of setting or hardening all kinds of bodies or elements made of reenforced concrete for building purposes, such as beams, ceilings, stairs, shaped stones and the like.

The process according to this invention consists in treating bodies made of reenforced concrete in a closed vessel with steam of about 9 kg. $cm^2$. during a certain period of time so as to set or harden the concrete to any desired degree, such bodies being introduced into the vessel and treated as indicated, after a primary setting of the concrete in the moulds to such an extent that the bodies may be conveyed to the vessel without jeopardizing their shape.

The time of treatment with steam and the height of pressure of the steam are chosen according to the kind of material used and to the desired degree of hardening.

Various experiments have shown that for instance, a stone made of reenforced concrete, after three days of moulding, being exposed during 9 hours to the action of steam of 9 atmospheres of pressure in a closed vessel, has immediately after this treatment the same supporting capacity as has a stone moulded at the same time and in quite a similar manner after a setting in air of six weeks. It is obvious that the conditions under which the bodies of reenforced concrete are set or hardened by the action of steam under pressure may be varied according to the quality of material employed and to the degree of setting as may be desired in any special case.

I am aware that is has already been proposed to harden bricks of chalky sandstone or of cement with steam under a pressure up to 6 atmospheres, but as far as I am aware articles or bodies made of reenforced concrete never have been set or hardened as I propose to do it.

By means of the process, it is possible to harden reenforced concrete bodies in a short time and to produce an article superior to that produced by the usual air hardening. Preferably dry steam is used in the process.

Having now particularly described and ascertained the nature of my invention, I declare that what I claim is:

The process of hardening bodies of reenforced concrete, which comprises molding the said bodies, permitting the concrete to partially set, and afterwards subjecting said bodies to the action of steam under pressure of substantially nine atmospheres, during a period of substantially nine hours.

In testimony whereof I affix my signature.

ING. ERNST MAIER.

Witness:
SIEGFRIED NEURTA.